April 8, 1969    B. J. JOSSE    3,437,967
LINEAR INDUCTION SYSTEM FEEDING A LOW VOLTAGE CURRENT
Filed April 21, 1967
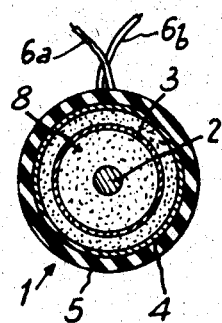
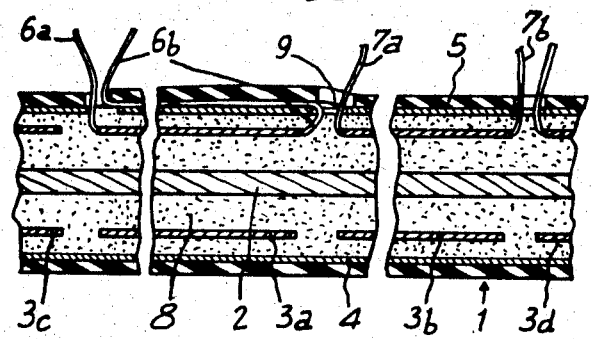
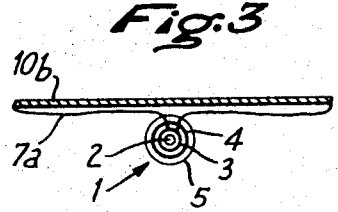
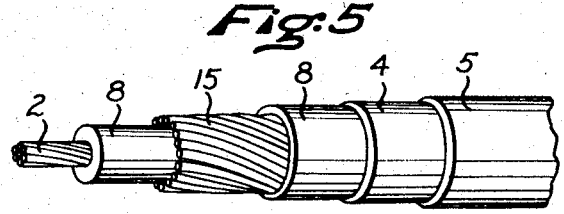
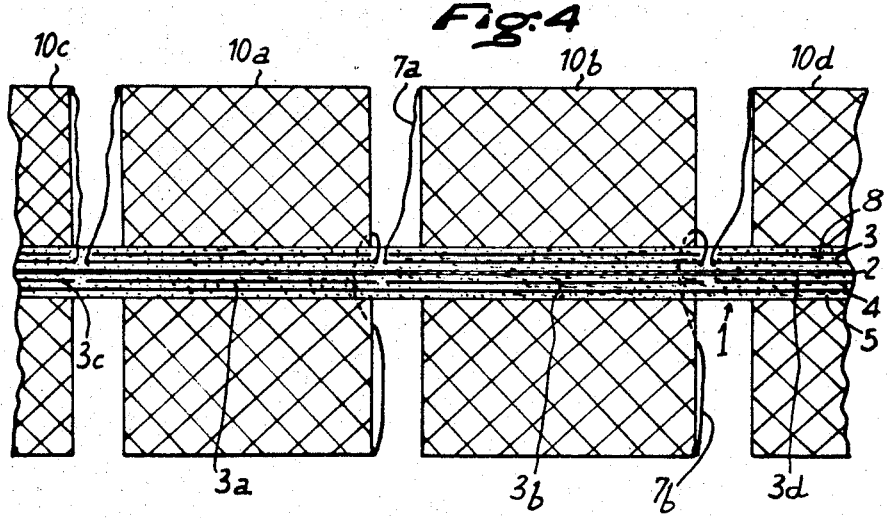
INVENTOR
BERNARD JEAN JOSSE
BY Edwin E. Greigg
ATTORNEY United States Patent Office 3,437,967
Patented Apr. 8, 1969

3,437,967
LINEAR INDUCTION SYSTEM FEEDING A LOW VOLTAGE CURRENT
Bernard Jean Josse, 7 Ave. Pierre Grenier, 92 Boulogne-Billancourt, France
Filed Apr. 21, 1967, Ser. No. 632,724
Claims priority, application France, Apr. 29, 1966, 59,739
Int. Cl. H01f 27/02, 17/06
U.S. Cl. 336—96    10 Claims

ABSTRACT OF THE DISCLOSURE

A compound cable comprising an inducing lead fed with A.C. and a succession of induced lead sections, the arrangement being surrounded by a magnetic sheath and embedded in an insulating material. The utilisation apparatus such as heated resistances or grids embedded in ground are connected across the terminals of the induced sections so as to be fed with low voltage current.

---

When it is desired to feed separately with a low voltage current a great number of electric receivers distributed over a considerable length or over an important area, it is necessary to make use of large lengths of low voltage feed cables, which means a high cost price.

In order to reduce said cost price, the present invention covers a linear induction system adapted to feed low voltage current and constituted by a cable including in combination on the one hand a main electric lead which is suitably insulated and adapted to be fed with A.C. and extending between the supply of energy and the remotest part of the area to be served and on the other hand at least one lead for an induced current, which is also insulated and extends at least along a fraction of the length of the main lead, while it is connected at each end with the utilisation apparatus associated with the corresponding area section and finally a magnetic circuit surrounding the system of leads thus proivded.

Each section of an induced lead is the seat of an A.C. electromotive force feeding the utilisation apparatus with which it is connected across its ends, the whole arrangement forming thus an electric circuit independent of the circuit fed with induced current corresponding to the other induced lead sections. The voltage available across the ends of one lead section is substantially proportional to the length of the latter. Obviously, a number of identical arrangements may be grouped so as to be fed respectively by each of the phases of a polyphase A.C.

The accompanying drawings illustrate by way of example a preferred embodiment of the invention. In said drawings:

FIGS. 1 and 2 are respectively a transverse and a longitudinal cross-section of one embodiment of a cable according to the invention.

FIGS. 3 and 4 illustrate cross-sectionally and in plan view an arrangement feeding a succession of metal heating grids and FIG. 5 is a perspective view of another embodiment having an induced lead of modified structure.

FIGS. 1 and 2 illustrate a linear induction system for feeding a low voltage current through a cable 1 enclosing a main electric lead 2, a lead for the induced current 3 constituted by a plurality of independent tubular sections 3a, 3b, 3c, 3d ... and a magnetic circuit constituted by a tube 4 made of a magnetic metal sheet.

A filling of insulating material 8 separates the different sections 3a, 3b of the lead 3 from the main lead 2, on the other hand from the magnetic circuit 4, lastly, the different successive tubular sections such as 3a, 3b from one another.

An insulating sheath 5 surrounds the magnetic circuit each end of each induced lead section is connected with a suitably insulated output wire passing out of the cable along a perforation 9 extending through the magnetic circuit 4 and the sheath 5. The two output wires corresponding to a same section extend outwardly through separate perforations as illustrated for the leads 7a and 7b corresponding to the induced lead section 3b or else through a same perforation in the sheath, as illustrated for the leads 6a and 6b corresponding to the section 3a. In the latter case, at least one of the leads 6b extends along said section 3a inside the cable in the space between the magnetic circuit 4 and the sheath 5.

The main lead 2 is fed by one phase low voltage A.C. Obviously, each section forms then the seat of an A.C. voltage which is available between its output wires such as 6a and 6b or 7a and 7b and which is substantially proportional to the length of the corresponding induced wire section.

In FIGS. 3 and 4, the arrangement serves for feeding a network of metal heating grids adapted to heat a large surface such as a road an airport runway or a market garden ground. The whole arrangement, including the grids which form the heating resistance is embedded within ground. In the case illustrated, the different parts of the arrangement carry the same reference numbers as those used for FIGS. 1 and 2. The cable 1 includes a main lead 2 surrounded by the induced current sections 3a, 3b, 3c, 3d forming the general lead 3 surrounded by the magnetic circuit 4, while an outer insulating sheath 5 protects the whole system. Each section of the lead corresponds to a heating resistance constituted by a metal grid such as 10a, 10b, 10c, 10d ... connected each with the ends of the corresponding section by two wires such as 7a, 7b.

When the main lead 2 is fed with a low voltage A.C. the section 3b for instance forms the seat of an induced low voltage A.C. feeding the heating resistances 10b. The voltage of the induced current in the latter is substantially proportional to the length of the section 3b. Said section is selected in a manner such that said voltage requires no particular care during operation more particularly as concerns French standards it is classified with the first category TBT, very low voltages.

The accompanying drawing illustrates the arrangement in a diagrammatic manner and in practice the connecting wires such as 7a and 7b are generally constituted by strip iron members which in the case of the embodiment illustrated in FIG. 4 are welded throughout the breadth of the corresponding heating grid.

As already mentioned, such an arrangement provides a substantial economy with reference to low voltage feeding cables. Furthermore, since the arrangement is embedded in the ground, the electric losses of the main lead are recovered completely.

Another embodiment of the invention is illustrated in FIG. 5. In the cable shown therein the induced lead is constituted by a series of wires 15 helically wound about the main lead 2 with the interposition of insulation 8.

The arrangements claimed may serve for many other applications and in particular for illuminating purposes for instance for the ground lighting of airport tracks.

What I claim is:

1. A linear induction cable system adapted to feed a low voltage current into at least one utilization apparatus, comprising a main inducing lead adapted to be fed with A.C., at least one induced lead section extending in parallel with at least a fraction of the length of said inducing lead, a magnetic circuit surrounding said inducing lead and induced lead sections, an insulating mass embedding said inducing lead and induced lead sections to insulate them from one another and from the magnetic circuit and wires connecting the ends of each induced lead section with the corresponding utilization apparatus.

2. A cable system as claimed in claim 1, wherein the induced lead sections form an alined series of substantially annular members surrounding the inducing lead.

3. A cable system as claimed in claim 1, wherein the induced lead sections form a succession of alined homogeneous tubular members surrounding the inducing lead.

4. A cable system as claimed in claim 1, wherein the induced lead sections form a succession of conductive strips wound helically round the inducing lead.

5. A cable system as claimed in claim 1, wherein each induced lead section is constituted by a plurality of wires helically wound round the inducing lead.

6. A cable system as claimed in claim 1, wherein the magnetic circuit is constituted by a solid tube made of a sheet of a magnetic metal.

7. A cable system as claimed in claim 1, comprising an outer protecting sheath provided with perforations for the passage of the wires connected with the ends of the induced wire leads.

8. A cable system as claimed in claim 1, comprising an outer protecting sheath provided with perforations for the passage of the wires connected with the ends of the induced wires, the wire connected with at least one end of at least one induced lead section passing between the magnetic circuit and the outer sheath in parallelism with the inducing lead and thence outwardly through the same perforation in the sheath as the wire connected with the other end of the same induced lead section.

9. A heating system incorporating the cable system claimed in claim 1, wherein the utilisation apparatus are constituted by heating systems.

10. A cable system as claimed in claim 1, wherein a number of successive induced lead sections are connected in series to feed a common utilisation circuit across the output terminals of the series of lead sections.

References Cited

UNITED STATES PATENTS

| | | | |
|---|---|---|---|
| 1,930,604 | 10/1933 | Bahrmann | 336—174 XR |
| 2,531,820 | 11/1950 | Lindenblad | 336—174 XR |
| 2,808,473 | 10/1957 | Romander | 336—174 XR |
| 2,945,912 | 7/1960 | Imhof | 336—173 XR |

LEWIS H. MYERS, *Primary Examiner.*

THOMAS J. KOZMA, *Assistant Examiner.*

U.S. Cl. X.R.

323—44; 336—174, 175; 219—213, 539